June 17, 1969           C. W. ROSS           3,449,965

SHIELD WITH MAGNETIC CONNECTING RING

Filed Jan. 16, 1967

INVENTOR
CHARLES W. ROSS
BY *William A. Murray*
ATTORNEY

United States Patent Office 3,449,965
Patented June 17, 1969

3,449,965
SHIELD WITH MAGNETIC CONNECTING RING
Charles W. Ross, 1100 Blackhawk Road,
Moline, Ill. 61265
Filed Jan. 16, 1967, Ser. No. 609,535
Int. Cl. F16j 15/52, 15/18
U.S. Cl. 74—18.1    13 Claims

ABSTRACT OF THE DISCLOSURE

A magnetic connecting ring used primarily in a shield device for an elongated control element that projects out of a housing structure and is adapted to move in respect to the wall of the housing structure, and composed of an annular magnetic structure that surrounds the control element and is magnetically attracted to the wall of the housing structure, and a flexible sleeve that fits around the element and is connected at one end to the magnetic structure and at the opposite end to the shank of the element.

BACKGROUND OF THE INVENTION

Field of the invention

This invention pertains to a magnetic connecting ring and a shielding device for closing a juncture between the external control mechanism on a housing structure and the housing structure and shielding the juncture against dirt, grit, and other foreign substances.

Description of the prior art

It has been known to mount a flexible sleeve about control elements that extend through a housing wall. One end of each sleeve is connected directly to the housing wall and the other end of the sleeve is connected directly to the shank of the respective control element so that the sleeve may prevent dirt, trash and other foreign matter from passing through the wall.

Heretofore, however, it is has been customary to support the one end of the sleeve on a flange-type metallic structure that in turn was bolted to the housing. However, in many instances the bolts are difficult to reach, particularly when a complete machine is assembled, and consequently for maintenance and replacement work there often is a major problem in removing the shield itself. Also, the housing wall must be sufficiently thick to receive and hold the bolts.

SUMMARY

The present invention pertains to a magnetic connecting ring structure and to a shield device for covering the external portion of a control element and shielding the juncture between the control element and housing. The ring structure is composed of inner and outer concentric rings sandwiching a permanent magnet between them and causing the rings to have opposite polarity to thereby create a high flux pattern across the edges of the rings. The shield device includes the annular magnetic ring structure so that it fits about the control element and is magnetically attracted to and sealed against the housing. A flexible sleeve is fixed to the magnetic ring structure and extends axially along the element to a remote end clamped to the element itself or to a connecting control link. A cap fits over the structure and clamps an end of the sleeve to the magnetic ring structure. A surface recess on the housing receives the ring structure.

The sleeve device as above described is not held on the housing wall by any removable parts. To remove the sleeve device from the housing it is only necessary to break the magnetic attraction between the housing and ring structure. This may be done by prying under the structure to raise it from the surface of the housing sufficiently that it may be manually removed from the housing.

DESCRIPTION OF THE PREFERRED EMBODIMENT

Figure 1:
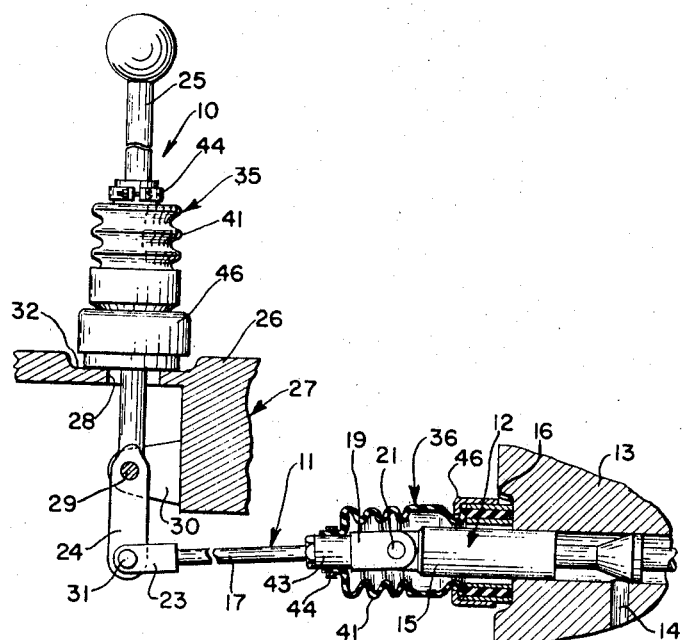
FIG. 1 is a vertical sectional view of a part of a valve structure, a valve control means including a valve spool and a shielding device for the external portion of the valve control means. Further included in FIG. 1 is a similar shielding device for the protection and covering the juncture between the main control lever and the housing floor.
Figure 2:
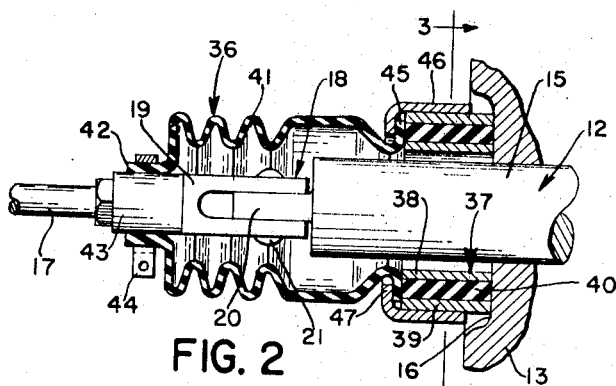
FIG. 2 is a vertical sectional view taken substantially along the line 2—2 of FIG. 1.
Figure 3:
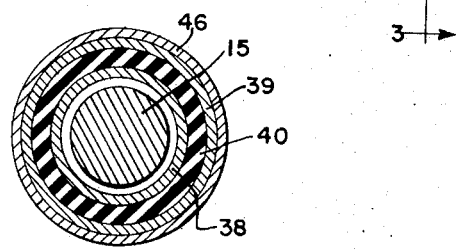
FIG. 3 is a sectional view taken along the line 3—3 of FIG. 2.

Referring now to the drawings, there is provided a pair of control element means 10, 11 in series with one another. The control element means includes a hydraulic valve control element 12 that extends into a valve housing 13 and has suitable orifices, one being shown at 14, utilized to pass fluid into a hydraulic motor which is not shown. The spool or element 12 has one portion within the hydraulic housing 13 and a portion 15 external of the housing that forms a juncture with the outer surface or wall of the housing. The housing has an annular recess 16 on its outer surface about the juncture and portion 15.

A connecting link 17 is connected to the end of the element 12 by an articulated joint 18 that includes in part a bifurcated end 19 on the link 17, a projecting lug 20 integral with the portion 15, and an interconnecting pivot pin 21. The spool 12 is adapted to slide axially in the housing 13 by pushing or pulling on the link 17.

The outer end of the link 17 has a bifurcated part 23 fitting about a flattened lower end 24 of a vertical control element or lever 25 that is the manual control portion of the control element means 10. The lever 25 projects upwardly over a horizontal panel 26, which may be a floor panel, or a second housing structure 27. An elongated opening 28 is provided to permit limited movement of the lever 25 about a horizontal pivot 29 at the top of the flat portion 25. Integral ears 30 extend from the housing structure and support the pivot 29. A second pivot 31 connects the lever 25 and bifurcated part 23. The panel 26 of the housing structure 27 has an annular recess 32 in its upper surface about the opening 28. As may be clearly evident from viewing FIG. 1, as the lever 25 rocks on its pivot 29, it will move the pin 31 in both a vertical and horizontal direction so that the rod 17 will adjust vertically on the pivot pin 21.

In order to keep the opening 28 from clogging with foreign matter to thereby hinder or block adjustment of the lever 25 there is provided a flexible shielding device 35. A second shielding device 36 is provided to cover and protect the joint between the outer end 15 of the spool 12 and the valve housing 13. The construction, other than minor details, of the two shields 35, 36 is identical and consequently detailed description shall be given only in regard to the shielding 36.

The shielding 36 is composed of an annular magnetized connector ring structure having inner and outer collars or rings 38, 39 respectively of magnetic steel or other magnetically attracted material and a permanently magnetized rubber ring 40 sandwiched therebetween, the latter being so magnetized that the rings 38, 39 have opposite polarity to thereby create a large flux pattern around the edges or radial surfaces of the ring structure 37. Therefore the connector ring 37 is strongly and magnetically attracted to and held against the housing 13 within the surface recess 16. The magnetic ring 37 fits loosely about the spool portion 15 of the control element means 11.

A flexible sleeve or bellows 41, which may be composed of rubber, rubberized fabric, plastic or treated fabric, extends from the connector ring or magnet 37 axially along the control element means and is necked down at its end 42 to fit on a shank portion 43 of the bifurcated part 19. A metal clip 44 holds the end 42 on the shank portion 43. The other end of the bellows 41 is formed to have a radial end flange 45 that bears against the outer annular end of the magnet 37. An annular metal cap 46 is swaged on the outer surface of the outer ring 39 and has an inwardly projecting radial flange 47 that extends inwardly and clamps the radial flange 45 of the sleeve 41 to the end of the connector ring structure 37.

The entire shield 36 is held on the control element means 11 by the clip 44. It is connected to the housing 13 by the magnetic connector ring structure 37. Once the structure 37 is applied to the surface of the housing it is held comparatively rigidly thereto. It may be adjusted for proper alignment with control element means 11 and may be removed from the housing without dismantling the shield. The flexible bellows 41 permits the articulation of the link 17 about the pin 21

In the shielding device 35, the base or magnet 37 of the device is somewhat larger to permit free movement of the lever 25 in the hole 28. The bellows or sleeve is connected directly to the lever or control element means 25. Although the lever 25 has a slightly different movement than the rod 17, the sleeve or bellows permits the articulation of the lever 25 about the pivot 29. The entire shielding device 35 is magnetically held on the panel 26 but may easily be adjusted for alignment purposes or easily removed for maintenance purposes.

The inner ring 38 of the magnetic connector ring 37, having only a single polarity, will have little or no magnetic attraction to the lever 25. In removing the magnetic connector ring structure 37 there is required nothing more than a wedge type tool that may be used to pry under the structure 37 or one of its portions. Also, by shifting the respective ring structure 37 onto the inclined surfaces forming the edges of the recesses 16 or 32, the ring structure may be slightly raised from the surface of the recess or housing wall. Once any part of the ring structure 37 is out of contact with the housing wall, it is relatively easy to completely remove it from the housing.

It is also to be understood that the connector ring structure 37 may be utilized to connect other parts, members and elements to a housing structure and while it is shown and described with a particular type of shielding device, it is not intended to limit it only in combination with such a device.

I claim:

1. A connector ring in combination with and for connecting a structure to a magnetically attracted surface, the connector ring being composed of inner and outer concentric rings of magnetic material and a permanent magnet ring disposed between the rings and adapted to induce opposite polarity between the rings whereby the radial edges of the rings will have a strong external flux field therebetween; and means supporting the structure on the connector ring whereby said structure will be magnetically held on the surface.

2. A shield device utilized in combination with a housing having a magnetically attracted surface and elongated element means extending from the housing and having at least a portion external of and movable relative to the housing, the shield device comprising: a connector ring encompassing a portion of the element means at the housing and composed of inner and outer concentric rings of magnetic material and a permanent magnetic ring disposed between the rings and adapted to induce opposite polarity between the rings whereby the radial edges of the rings will have a strong external flux field therebetween; a flexible sleeve extending lengthwise of the elongated element means from one end adjacent the connector ring to a second end remote thereof; means for fixing the one end of the sleeve to the connector; and means for fixing the second end of the sleeve to the element means.

3. The invention as set forth in claim 2 in which the housing is a hydraulic valve housing and the element means is in part a spool valve that is adapted for axial movement by adjustment of said portion external of the housing.

4. The invention as set forth in claim 3 in which the external portion is an integral portion of the spool valve and extends through the connector ring.

5. The invention as set forth in claim 2 in which the housing has a surface recess, and the connector ring normally recesses in the recess.

6. The invention as set forth in claim 2 in which the element means is a rigid elongated member that projects outwardly in respect to the housing and the connector ring substantially seals the shield device on the surface of the housing at the entry of the control element means into the housing.

7. The invention as set forth in claim 2 further characterized by the element means being a lever supported for pivotal movement on one side of the housing adjacent its wall, and the shield device is magnetically attached to the wall by the connector ring and the sleeve accommodates movement of the lever about the pivotal support of the lever.

8. The invention as set forth in claim 2 further characterized by the control element means being elongated and supported by the housing for predominantly axial movement and whereby the sleeve is extendable and retractable to accommodate axial adjustment of the control element means.

9. The invention as set forth in claim 1 in which the outer ring has an outer annular surface, and the structure is a shield and the means supporting it on the connector ring is an annular cap held on the outer ring and serving to clamp the end of the shield to the connector ring.

10. The invention as set forth in claim 9 in which the cap has a radial inwardly extending flange that engages and holds the end of the shield against the end of the connector ring.

11. The invention as set forth in claim 1 further characterized by the surface having at the juncture with the connecting ring an annular recess larger than the size of the outer ring whereby the connector ring may reside in the recess.

12. The invention as set forth in claim 11 in which the surface of the recess is inclined whereby as the connector ring is shifted, it will cause a portion of the connector ring to disengage the wall.

13. A sleeve structure for a device in which there are provided movable elements at least part of which extend through a wall, the sleeve structure comprising: a magnet encompassing the part of the elements and adapted to be magnetically held against and attracted to the wall at the juncture between the part of the elements and wall; a flexible sleeve supported about and extending longitudinally of the part of the elements and having one end fixed to the magnet and extending therefrom to an opposite end; and means for fixing the opposite end on said part of the elements whereby said sleeve may adjust itself in accordance with the movement of the part of the elements.

References Cited

UNITED STATES PATENTS 3,306,621   2/1967   Fisher _____ 277—80

MILTON KAUFMAN, *Primary Examiner.*

U.S. Cl. X.R.

74—18.2; 92—168; 335—303